(12) United States Patent
Stahler et al.

(10) Patent No.: US 6,679,673 B1
(45) Date of Patent: Jan. 20, 2004

(54) TRAILER RACK

(75) Inventors: Jayson D. Stahler, Murray, KY (US); Kenny W. Kingins, Murray, KY (US)

(73) Assignee: Trailer Tack, LLC, Murray, KY (US)

( * ) Notice: Subject to any disclaimer, the term of this patent is extended or adjusted under 35 U.S.C. 154(b) by 85 days.

(21) Appl. No.: 09/935,036

(22) Filed: Aug. 22, 2001

Related U.S. Application Data

(60) Provisional application No. 60/264,981, filed on Jan. 30, 2001.

(51) Int. Cl.$^7$ .................................................. B60R 9/04
(52) U.S. Cl. ...................................................... 414/467
(58) Field of Search .................. 414/467, 473, 414/478, 486, 543, 546; 119/400; 224/400

(56) References Cited

U.S. PATENT DOCUMENTS

| | | | |
|---|---|---|---|
| 2,621,070 A | | 12/1952 | Crivella |
| 2,733,095 A | | 1/1956 | Crivella |
| 3,502,366 A | | 3/1970 | Poleschook |
| 3,519,154 A | * | 7/1970 | Riley ........................... 414/462 |
| 3,696,979 A | * | 10/1972 | Erickson ...................... 224/309 |
| 3,836,024 A | * | 9/1974 | Mantino ....................... 414/543 |
| 3,885,524 A | | 5/1975 | Gregory |
| 4,065,041 A | * | 12/1977 | Stegavig et al. ............. 224/327 |
| D258,308 S | * | 2/1981 | Weissman et al. ............ D30/15 |
| 4,378,898 A | * | 4/1983 | Smeenge et al. ............. 224/328 |
| 4,498,418 A | | 2/1985 | Chumley |
| 4,718,587 A | | 1/1988 | Roberts |
| 4,974,766 A | * | 12/1990 | DiPalma et al. ............. 224/328 |
| 4,991,895 A | | 2/1991 | Artho |
| 5,405,234 A | | 4/1995 | Ziaylek, Jr. et al. |
| 5,474,312 A | | 12/1995 | Starita et al. |
| 5,603,597 A | | 2/1997 | Clay, Sr. |
| 5,651,330 A | | 7/1997 | Jewett |
| 5,752,799 A | * | 5/1998 | Carey et al. ................. 414/543 |
| 5,769,478 A | * | 6/1998 | Vernese ....................... 296/24.2 |
| 6,234,371 B1 | * | 5/2001 | Sinn ............................ 224/328 |

FOREIGN PATENT DOCUMENTS

FR 2 771 979 * 12/1997 ............. B60R/9/04

* cited by examiner

Primary Examiner—Eileen D. Lillis
Assistant Examiner—Charles A Fox
(74) Attorney, Agent, or Firm—Waddey and Patterson; David B. Pieper; Phillip E. Walker

(57) ABSTRACT

A trailer storage rack for transporting material and fluids with a livestock trailer. The trailer storage rack mounts to the livestock trailer to transfer the weight and forces of operation to the trailer. The storage rack may be spaced above the trailer to allow for the use of trailer roof vents. An open compartment, dry storage compartment and a fluid compartment are described. Loading and unloading means for the open and dry storage compartment include a rotatable lifting crane that may be compacted and stored in the storage compartment. Access for filling and the draining the fluid compartment is provided by connecting the fluid compartment to side conduits of a ladder such that the side conduits of the ladder act as pipes connected to the fluid compartment. A water hose connection valve is attached to the conduits for access at the ground level to provide easy access for filling and draining the fluid storage compartment.

11 Claims, 4 Drawing Sheets

TRAILER RACK

This application claims benefit of Provisional U.S. Patent Application Serial No. 60/264,981 filed Jan. 30, 2001, entitled "Trailer Rack."

FIELD OF THE INVENTION

The present invention relates generally to a storage device for attachment to a livestock trailer for the transportation of dry goods and fluids with livestock. More particularly, the present invention relates to a storage rack that attaches to the top of a livestock trailer for transporting equipment, feed, and water for use with and care for the animals being transported.

BACKGROUND OF THE INVENTION

While transporting livestock in a trailer, it is also desirable to transport items which are used with the animals or which satisfy the nutritional and physiological requirements of the animals. These items can include hay, feed, water, and equipment such as saddles, bridles, packs, veterinary supplies, spare equipment, and other material for use with or care for the animal. A good example of this need is found at horse shows or riding events which occur through the United States. A horse show may bring together large concentrations of people and animals. This large concentration can place a heavy burden on water supplies, feed supplies, or the accessibility of spare equipment and access to food or water may not necessarily be guaranteed. Thus, it is desirable to carry the feed, livestock, and equipment for the animal to the horse show. This also applies to other events such as trail rides, livestock sales, and other events where the animals are transported from one location to another. Therefore, it is desirable to have an independent and self contained trailer rack which contains food, fluids, and any necessary equipment.

It is also important that the food, fluid, and other material stored for the animals can be easily put in place by a single person of ordinary strength. Given the bulky nature and concentrated weight of items associated with the care and enjoyment of animals, the mechanisms for loading and unloading these materials are equally as important as the ability of the trailer rack to store such items. For example, horse feed is often sold in fifty pound sacks and hay bales often weigh upwards of eighty pounds. Consequently, movement and storage of these items can be burdensome.

Thus, there is a need for a trailer rack, storage, and handling apparatus and system for attachment to a trailer which meets these needs.

SUMMARY OF THE INVENTION

In accordance with the present invention, a trailer rack apparatus and method is provided which addresses the drawbacks of the prior art and in one of its exemplary forms includes a two sided rack for attachment to the side supports of a trailer for carrying food, water and equipment above a trailer.

In accordance with one embodiment of the present invention, a storage rack is provided comprising first and second side supports extending from a storage chamber and attached to the sides of a trailer so that the weight of the rack, the weight of items placed into the rack, and any aerodynamic forces acting on the storage rack are transferred to the sides of the trailer.

In accordance with one example of the present invention, the unit is equipped with extended side supports so that the rack is suspended above the trailer so that roof vents on the trailer may still be used to provide airflow in the trailer.

In accordance with another example, the unit has a lifting crane to allow for the easy loading and unloading of the rack.

In accordance with yet another example, the unit is equipped with a ground level water loading, unloading, and pressurization system that allows for water to be carried in the rack and easily accessed. One of the unique aspects of the present invention is the use of side supports of a ladder for providing the water conduits. This minimizes the weight of the system while still providing the desired functionality.

It is an object of the present invention to provide a trailer rack for attachment to a conventional livestock trailer to effectively transport dry goods and fluids.

It is a further object of the present invention to provide a storage rack for a livestock trailer so that any weight present in the storage rack or any aerodynamic forces applied to the storage rack are transferred to the sides of the livestock trailer.

A still further object of the present invention is to provide a storage rack having a storage chamber further comprising a fluid tight seal so that no precipitation enters the storage chamber.

It is an object of the present invention to provide a lifting system so that objects may be lifted to the top of the livestock trailer.

It is a further object of the present invention to provide a fluid and dry goods transportation system having a storage compartment and a fluid storage compartment attached to the frame of a livestock trailer for the transportation of dry goods and fluids. The fluid storage container having a breather and a conduit so that fluid enters the fluid storage compartment through the conduit from a ground level and the fluid exits from the fluid storage compartment through the conduit to the ground level.

It is another object of the present invention to provide a fluid pump attached to a first conduit so that the fluid pump generates pressure to move fluid into or out of the fluid storage tank by use of the first conduit.

A still further object of the present invention is to provide substantially horizontal members attached a conduit for accessing the top of the livestock trailer.

These together with other objects and advantages which will become apparent reside in the details of construction and operation as more fully here and after described and claimed, with reference to the accompanying drawings forming a part thereof.

DESCRIPTION OF THE PREFERRED EMBODIMENTS

Figure 1:
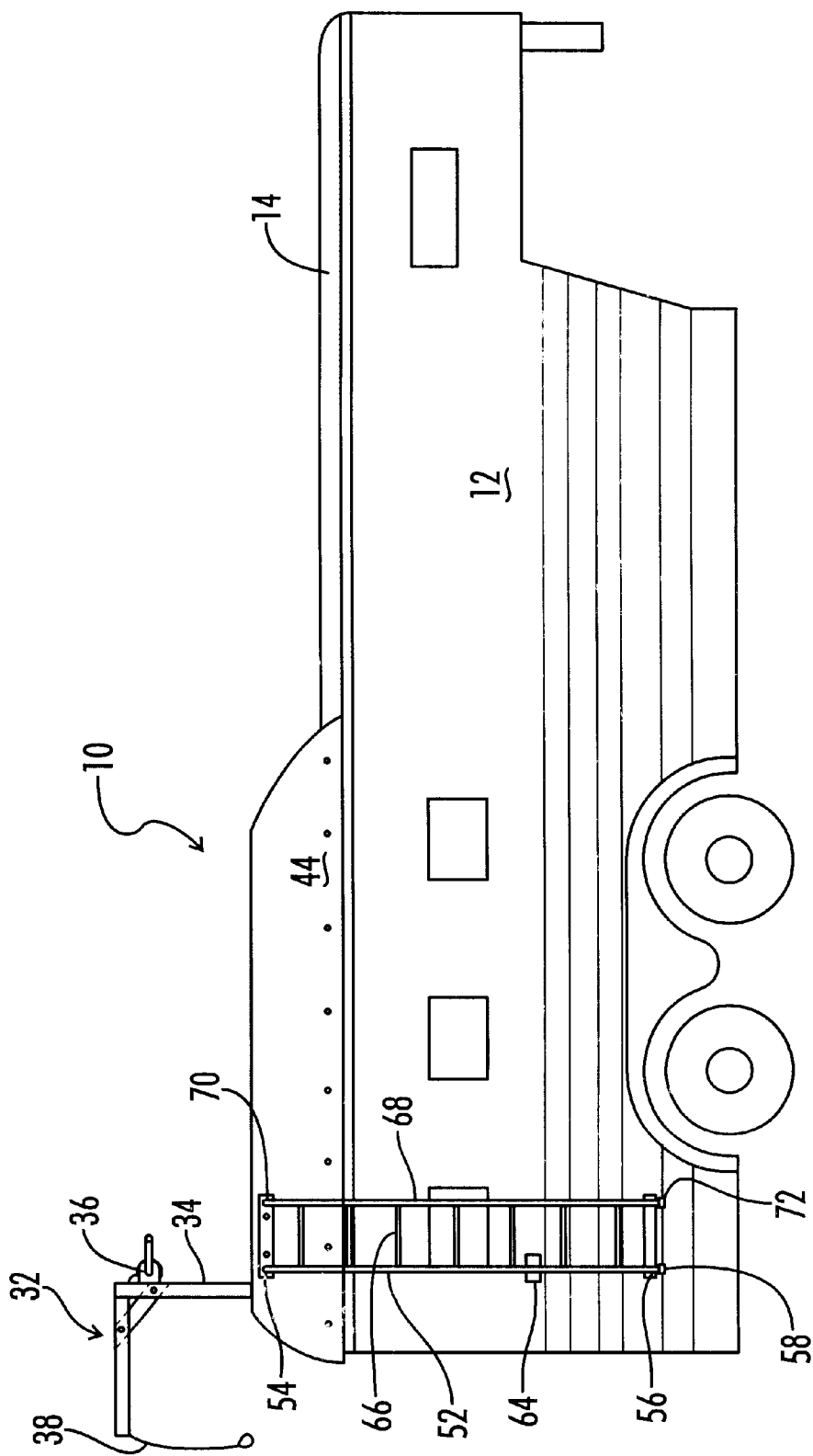
FIG. 1 is an elevated side view of the storage rack and livestock trailer.
Figure 2:
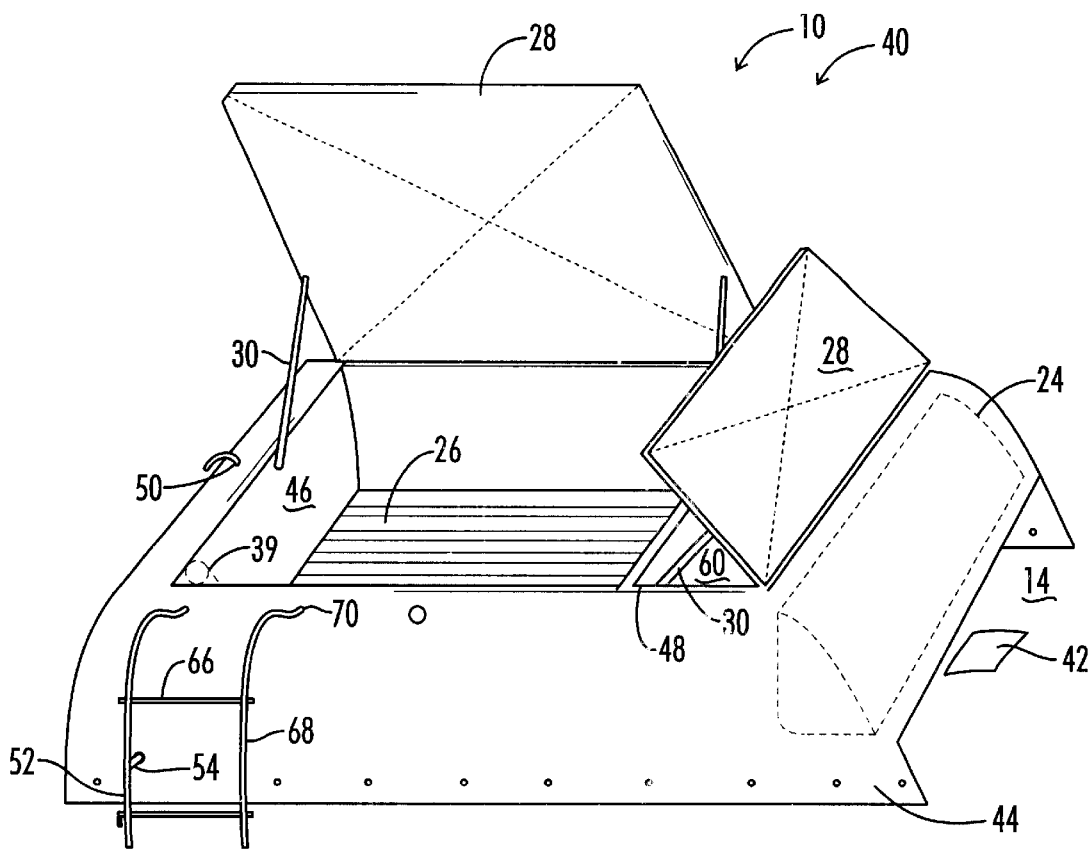
FIG. 2 is an isometric view of the storage rack showing the multiple storage compartments.
Figure 3:
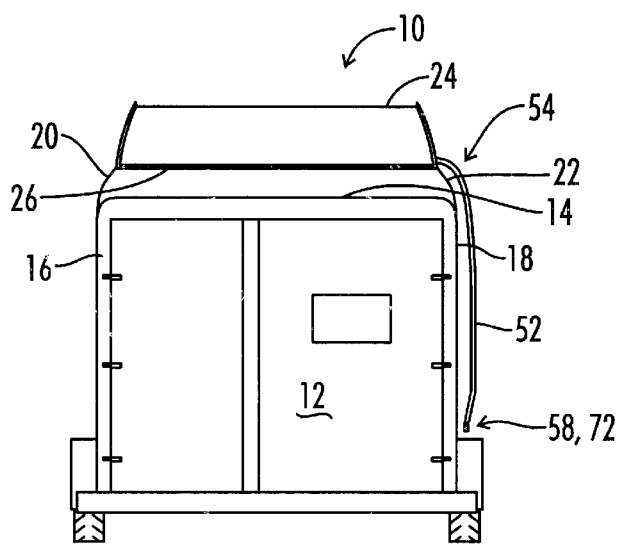
FIG. 3 is an elevated rear view of the storage rack and livestock trailer.

Referring now to FIGS. 1–3, there is shown a storage rack 10 for a livestock trailer 12. This rack 10 allows for food, water, and equipment for use with the livestock carried in the trailer to be transported along with the livestock. In FIG. 2 and 3 there is shown the preferred embodiment in which the storage rack 10 is attached to a livestock trailer 12 having a trailer roof 14, a first trailer side 16 and a second trailer side 18. The storage rack 10 has a first side support 20 positioned to engage and attach to the first trailer side 16. The storage rack 10 also has a second side support 22 positioned to engage and attach to the second trailer side 18. The storage rack 10 also has a storage chamber 24 spanning the first side support 20 and the second side support 22 so that any weight present in the storage chamber 24 or aerodynamic forces acting on the storage chamber 24 are transferred to the sides of the livestock trailer, 16 and 18. In the preferred embodiment, the storage chamber 24 has a bottom surface or floor 26 arranged to be located above and spaced from the trailer roof 14. This allows for the bottom or floor 26 of the rack 10 to clear any vents or other items on the trailer roof 14. Thus, items may be carried in the rack 10 without interfering with airflow provided by these vents. The storage chamber 24 also has a solid or mesh lid 28 covering the storage chamber 24 and movable to an open position and a closed position. A solid lid 28 is used to retain dry goods in the storage chamber and a mesh lid 28 is used when environmental conditions will not affect the items being carried.

One of the important aspect of the present invention is the transfer of forces on the trailer rack 10 to the sides of the trailer 12. When a trailer 12 is traveling at highway speed, large aerodynamic forces are placed on the storage rack 10. For the preferred embodiment, the storage chamber 24 attaches to the first side support 20 and the second side support 22 so that the storage chamber 24 and the connections to the trailer 12 can withstand these aerodynamic forces and remain attached when traveling at highway speed, during high wind conditions, during impact from overhanging trees and other naturally occurring events that may occur to the rack 10 during its use.

Figure 5:
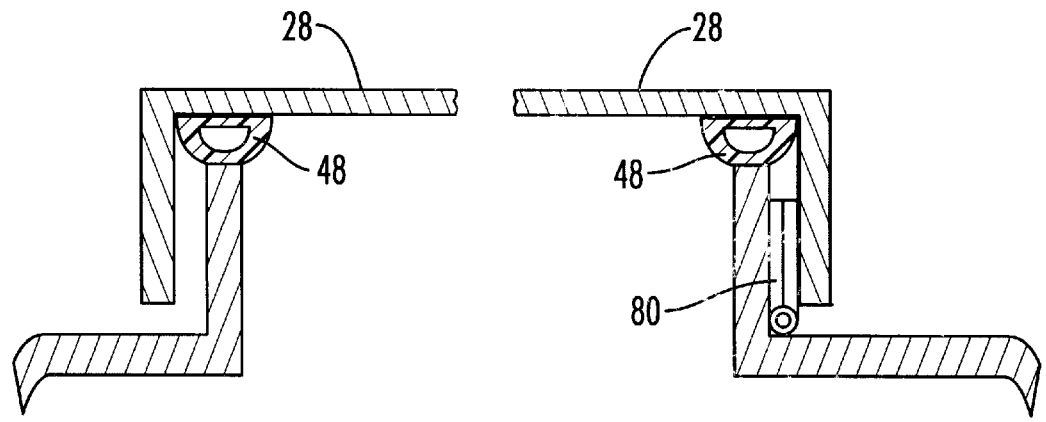
FIG. 5 is a cross section view of the storage rack showing the fluid tight seal.
Figure 6:
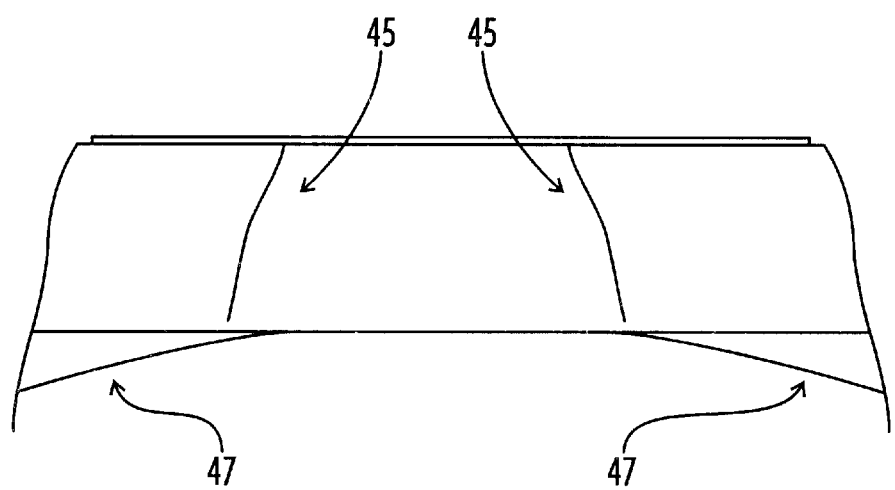
FIG. 6 is a cross section view of the fluid storage compartment.

Referring now to FIGS. 2 and 5, there is shown the storage chambers 24. If the preferred embodiment, the storage chambers 24 have a fluid tight seal 48, which may be described as a solid core foam seal 48, contacting the solid lid 28 in the closed position so that no precipitation enters the storage chamber 24. In one embodiment, a continuous aluminum piano hinge 80 can be used to facilitate the closure of the solid lid 28. The storage chambers 24 additionally have a gas shock or piston 30, shown in FIG. 2, the piston 30 having a first end attached to the solid lid 28 and having a second end attached to the storage chamber 24 so that the piston 30 moves or assists the movement of the solid lid 28 between an open position and a closed position.

Figure 4A:
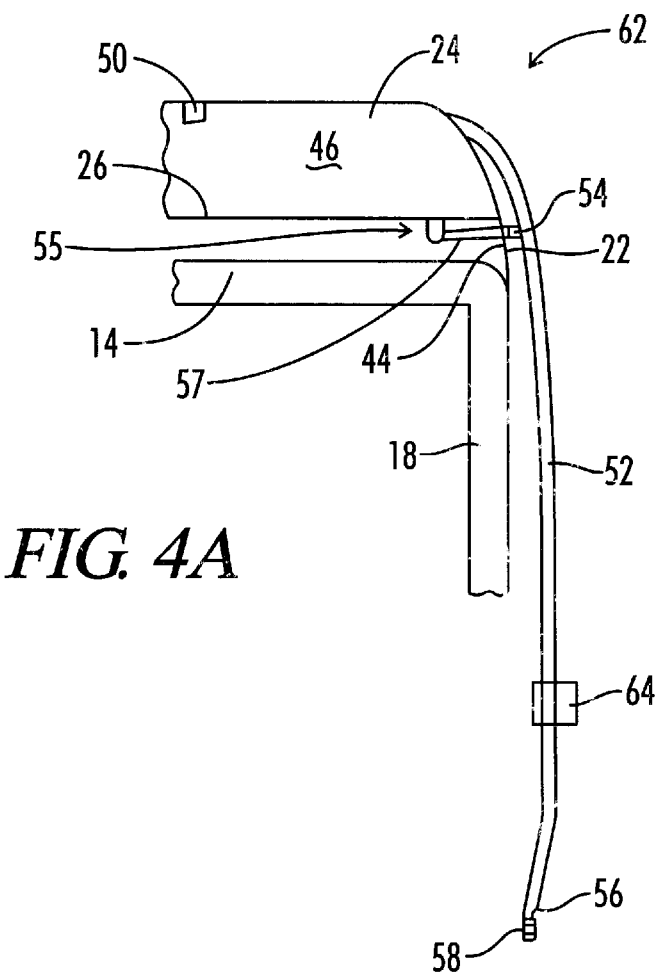
FIG. 4a is an elevated rear view of the fluid transportation system showing the conduit for filling and draining from the ground level.
Figure 4B:
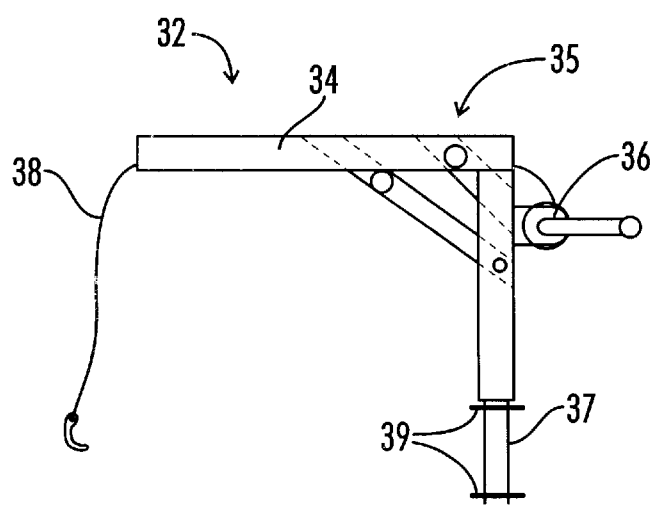
FIG. 4b is an elevated side view of the lifting system showing the arm, winch, and cable.

FIG. 4b shows a lifting system 32 attached to at least one of the storage chambers 24. The lifting system 32 has an arm 34 attached to the storage chamber 24 by a lower tube 37 passing through hole brackets 39, a wench 36 attached to the arm 34, and a cable 38 attached to the wench 36. The lifting system 32 should be arranged so that the arm 34 will extend over the side 16 of the trailer 12. The cable 38 may then be lowered to ground level. An item may be attached to the cable 38, and the cable 38 retracted by the wench 36 to raise the item to the roof 14 of the trailer 12. The lifting system 32 will then rotate or swing the suspended item from overhanging the side 16 of the trailer 12 to above the storage compartment 24. The rotation of the lifting system 32 is provided by turning the lower arm 37 in the hole brackets 39. Once the item is rotated above the storage compartment 24, the item may be lowered into the storage compartment 24 and disconnected from the cable 38 for storage. The reverse process may be used to unload an item from the storage compartment 24. In this manner, objects may be easily lifted to the top of the livestock trailer 12 and placed in the storage compartment 24 and later removed form the storage compartment 24 and lowered to ground level.

The lifting system 32 is designed to be compacted, folded, or stored so that it may be easily transported and used with the storage chamber 24. For the present embodiment, the lifting system is connected to the storage compartment by lifting the entire assembly upright and placing the lower tube 37 in the hole brackets 39 attached to the storage chamber 24 as shown in FIG. 2. Generally, two hole brackets 39 are used to support the lower tube in at least two places. Thus, a hole bracket 39 may be placed at the top and bottom of the storage chamber 24. The placement of the lower tube 37 in the hole brackets 39 orients the lifting system 32 for use in loading and unloading the storage rack 24. After use, the lifting system may be compacted by lifting the lower tube 37 out of the hole brackets 39 and placing the lifting system 32 in the storage compartment 24. The lifting system 32 can be folded about folding point 35 to facilitate storage of the lifting system 32.

A fluid and dry goods transportation system 40 is disclosed by the present invention. Referring now to FIGS. 1, 2 and 4a, there is shown a fluid and dry goods transportation system 40 which has a livestock trailer 12, having a first trailer side support 16, also called a first trailer side, and a second trailer side support 18, also called a second trailer side, and a trailer roof 14. The trailer roof 14 has a vent 42. The fluid and dry goods transportation system 40 has a frame 44 attached to the first trailer side support structure 16 and the second trailer side support structure 18 of the livestock trailer 12 and positioned above the trailer roof 14 of the livestock trailer 12 so that the vent 42 is not blocked.

Referring now to FIG. 2, there is shown a fluid and dry goods transportation system 40 having a first storage compartment 46 attached to the frame 44 so that any weight located in the first storage compartment 46 and any aerodynamic force applied to the first storage compartment 46 are transferred to the first trailer side support 16, also described as a first trailer side, and the second trailer side support 18, also described as a second trailer side, of the livestock trailer 12. The first storage compartment 46 has a solid lid 28 covering the first storage compartment 46 and moveable between an open position and a closed position. The first storage compartment 46 also has a fluid tight seal 48, shown in FIG. 5, between the solid lid 28 and the first storage compartment 46, so that no fluid enters the first storage compartment 46 when the solid lid 28 is moved to the closed position.

Referring now to FIG. 2, there is shown a fluid and dry goods transportation system 40 that has a non-fluid storage compartment 60 attached to the frame 44. The non-fluid storage compartment 60 has a solid lid 28 moveable between an open position and a closed position. The non-fluid storage compartment 60 also has a fluid tight seal 48 between the non-fluid storage compartment 60 and the solid lid 28 so that no precipitation enters the non-fluid storage compartment 60 when the solid lid 28 is in the closed position.

The present invention is constructed of materials that are weather resistant, light in weight and structurally strong.

More specifically, the weather resistant aspect of the construction material is important so that said material is not affected by any type of weather. Additionally, the lightweight nature of the construction material will reduce the load that is placed on the livestock trailer. Finally, the material must offer sufficient strength to withstand the weight of any items that are stored.

Referring now to FIGS. 1, 2, and 4a, there is shown a fluid transportation system 62 attached above a livestock trailer 12. The fluid transportation system 62 has a frame 44 positioned to engage the sides of the trailer, the first trailer side 16 and the second trailer side 18 so that the frame 44 is located above and positioned from the livestock trailer 12. The fluid transportation system 62 also has a fluid storage tank 46, also described as a fluid storage compartment 46 or a first storage compartment 46, attached to the frame 44 so that aerodynamic force applied to the fluid storage tank 46 and weight located in the fluid storage tank 46 are transferred to both the first trailer side 16 and the second trailer side 18.

As shown in FIG. 4A, one of the storage compartments 24 may be used as a fluid storage compartment 46 to store and transport fluids such as water. The fluid storage compartment 46 has a breather 50 to relieve excess pressure in the compartment 46 to allow for fluid overflow during pressurized filling of the compartment 46 and to allow for air to enter the compartment 46 during draining. The fluid storage compartment 46 is attached to a conduit 52 having a first end 54 and a second end 56. The first end 54 is fluidly connected to the fluid storage compartment 46 so that the fluid enters and exits the fluid storage compartment through the conduit 52. The second end 56 is placed at ground level to allow for easy connection to the fluid storage compartment. The second end 56 is equipped with a standard ;hose connection valve 58. This valve 58 allows for easy connection to a standard garden hose or other available water supply and allows for control of water flow into and out of the fluid storage compartment 46 from a person standing at the ground level. Pressure from most water supply systems is sufficient to fill the compartment located on top of the trailer 12 from the valve 58. The fluid transportation system 62 can also be connected to a fluid pump 64 attached to the first conduit 52 so that the fluid pump 64 generates pressure to move fluid into or out of the fluid storage tank 46 by use of the first conduit 52. This pump 64 allows for pressurized filling of the water tank 46 from a non-pressurized source such as a stock tank, creek, or pond. The pump 64 also allows for pressurized flow out of the tank 46 for spraying off the animals or other such uses of pressurized water.

In one embodiment of the present invention, fluid transportation system 62 includes a fitting 55 and a flex hose 57 that attach to and cooperating with the first end 54 to facilitate the fluid flow to a from the fluid storage compartment 46 through the conduit 52. The invention can also include baffles 45 located in the fluid storage compartment 46 to subdivide the fluid storage compartment 46 into multiple sections. Also, corner braces 47 can be positioned between the floor 26 and the first and second side supports 20 and 22 to provide further stability to the rack 10. In a preferred embodiment, eight corner braces 47 are included.

The mechanisms used for loading the food and fluid items into the present trailer rack can be used to load material for transportation and are also reversible to allow removal of the same. These mechanisms will allow rapid removal of items placed in the trailer rack so that removal and use of the items may occur in a short period of time. Providing the livestock being transported with the items placed in storage in the trailer rack ensures the humane transport of the livestock. Additionally, if the livestock consists of racing horses or show horses, the performance of the animal may be enhanced by transport in a manner that allows access to food and/or water.

Thus, although there have been described particular embodiments of the present invention of a new and useful Trailer Rack, it is not intended that such references be construed as limitations upon the scope of this invention except as set forth in the following claims.

We claim:

1. A fluid and dry goods transportation system, comprising:

a livestock trailer having a first and second trailer side support structures and a trailer roof, and having a vent in the trailer roof;

a frame attached to the first and second trailer side support structures of the livestock trailer and positioned above the trailer roof of the livestock trailer so that the livestock trailer roof vent is not blocked; and a fluid storage compartment attached to the frame so that any weight located in the fluid storage compartment and any aerodynamic force applied to the fluid storage compartment are transferred to the first and second trailer side support structures the livestock trailer;

wherein the fluid storage compartment includes:

a breather attached to the first storage compartment so that a fluid is released during overflow and air enters during draining;

a conduit having a first end and a second end, the first end fluidly connected to the first storage compartment so that the fluid enters the first storage compartment through the conduit from a ground level and the fluid exits from the first storage compartment to the ground level through the conduit; and a valve attached to the second end of the conduit so that the first storage compartment is filled or drained from the ground level.

2. The fluid and dry goods transportation system of claim 1, further comprising a non-fluid storage compartment attached to the frame.

3. The fluid and dry goods transportation system of claim 2, wherein the non-fluid storage compartment further comprises:

a solid lid movable between an open position and a closed position; and a fluid tight seal between the non-fluid storage compartment and the solid lid, so that no precipitation enters the non-fluid storage compartment when the solid lid is in the closed position.

4. A fluid transportation system attached above a livestock trailer, comprising:

a frame positioned to engage sides of a livestock trailer so that the frame is located above and positioned from the livestock trailer;

a fluid storage tank attached to the frame so that aerodynamic force applied to the fluid storage tank and weight located in the fluid storage tank are transferred to the sides of the livestock trailer; and a first conduit having a first end and a second end, the first end fluidly connected to the fluid storage tank so that the fluid enters the fluid storage tank through the first conduit from a ground level and the fluid exits from the fluid storage tank to the ground level through the first conduit.

5. The fluid transportation system of claim 4, wherein the fluid storage tank further comprises a breather attached to the fluid storage tank so that a fluid is released through the breather when overfilling occurs and air enters the fluid storage tank through the breather when the fluid storage tank is drained.

6. The fluid transportation system of claim 4, further comprising a fluid pump attached to the first conduit so that the fluid pump generates pressure to move fluid into or out of the fluid storage tank by use of the first conduit.

7. The fluid transportation system of claim 4, further comprising a valve attached to the second end of the first conduit so that the fluid storage tank is filled or drained from the ground level.

8. The fluid transportation system of claim 4, wherein the first conduit is rigid.

9. The fluid transportation system of claim 8, further comprising a substantially horizontal member attached to the first conduit and adapted to provide vertical rungs for accessing a top of the livestock trailer.

10. The fluid transportation system of claim 9, further comprising a second conduit having a first end and a second end, the first end fluidly connected to the fluid storage tank so that the fluid enters the fluid storage tank through the second conduit from a ground level and the fluid exits from the fluid storage tank to the ground level through the second conduit.

11. The fluid transportation system of claim 10, wherein the substantially horizontal member attaches to the second conduit and is adapted to provide vertical rungs for accessing the top of the livestock trailer.

\* \* \* \* \*